United States Patent Office 2,892,280
Patented June 30, 1959

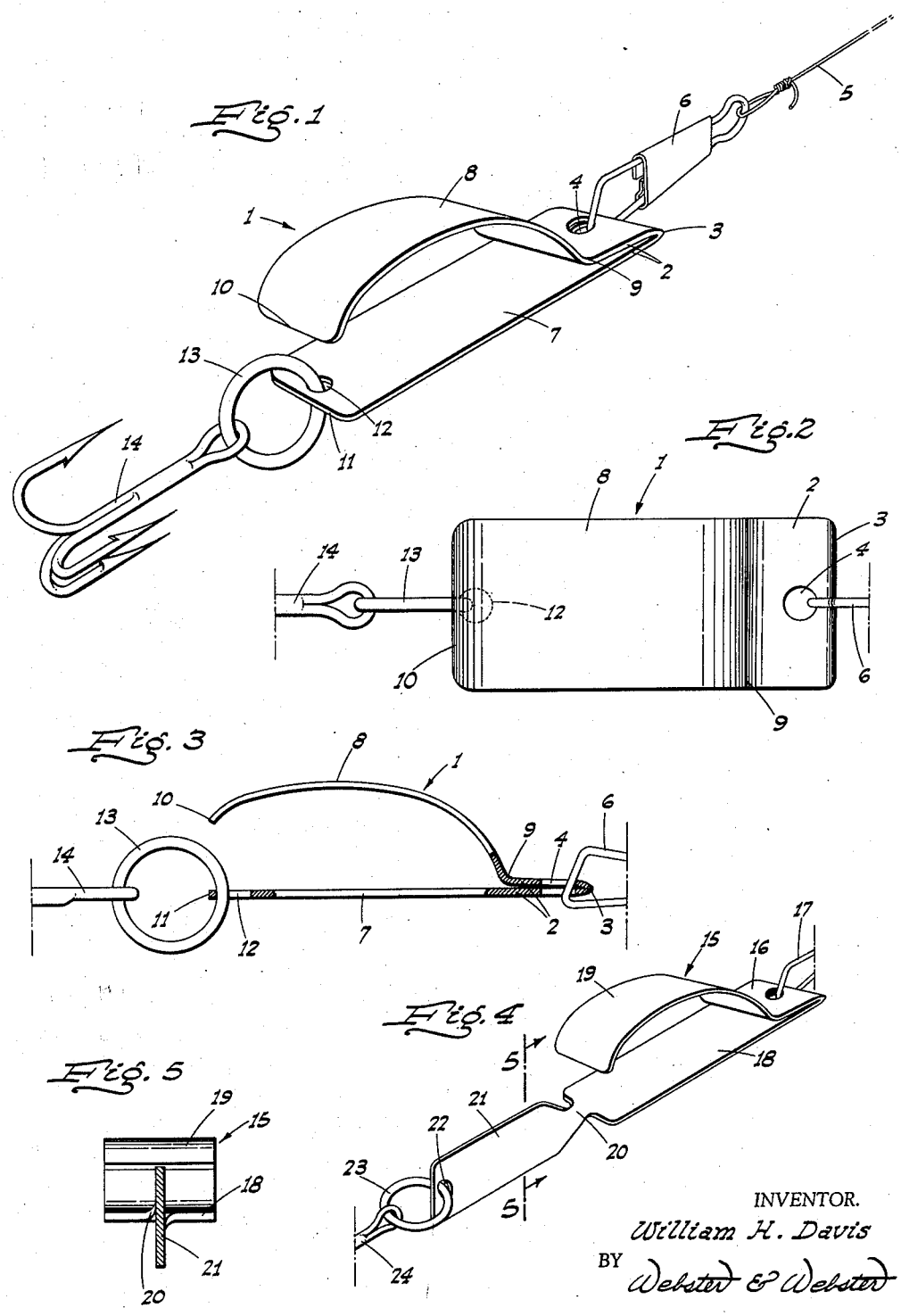

2,892,280

FISHING LURE

William H. Davis, Stockton, Calif.

Application November 26, 1957, Serial No. 699,011

5 Claims. (Cl. 43—42.5)

The present invention relates to, and it is a major object to provide, a fishing lure of the type which is adapted to be cast and retrieved, or trolled.

Another important object of this invention is to provide a fishing lure, of the type described, which has a positive and live action when pulled through the water, and an action which—in representation of the motion of a small bait fish or the like—induces game fish to readily strike at the lure when it is in use.

An additional object of the invention is to provide a fishing lure, as in the previous paragraph, wherein the character of the action of the lure can be controlled, by the fisherman, by merely varying the speed of movement of the lure in the water.

A further object of the invention is to provide a fishing lure wherein the body thereof is formed so as to minimize possible entanglement with under-water growth or debris.

It is also an object of the invention to provide a fishing lure which—by reason of a simple body design, and construction from a single or one-piece strip of metal—can be readily and economically manufactured.

Still another object of the invention is to provide a practical, reliable, and durable fishing lure, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view, in substantial enlargement, of the fishing lure as connected to a fishing line.

Fig. 2 is a top plan view of the fishing lure.

Fig. 3 is a side elevation of the fishing lure, partly in section.

Fig. 4 is a perspective view, on a reduced scale relative to Fig. 1, of a modification of the fishing lure.

Fig. 5 is a transverse vertical sectional elevation taken on line 5—5 of Fig. 4.

Referring now more particularly to the drawings, and to the characters of reference marked thereon, and at present to the fishing lure as shown in Figs. 1–3 inclusive, such lure comprises a body, indicated generally at 1.

The lure body 1 is formed, as shown, from a single or one-piece strip of metal, which is flat, elongated, and of constant width. Such strip of metal—intermediate its ends—is bent back upon itself to form a substantially flat, forwardly projecting, double-thickness tongue 2, whose leading edge is indicated at 3; such tongue being formed with a central hole 4 which permits a fishing line 5 to be connected to the front of the lure by means of a conventional snap 6, or the like.

Rearwardly of the tongue 2, and in integral relation therewith, the lure body 1 includes an elongated flat bottom plate 7 which is of course a rearward extension of the bottom layer of said tongue, and—as a rearward extension of the top layer of the tongue—an arcuate upper plate 8 which arches over, and extends substantially the full length of, said bottom plate 7.

As the metallic strip from which the lure body 1 is constructed is of constant width, the related side edges of the flat bottom plate 7 and arcuate upper plate 8 lie in the same vertical planes. The transverse line of bend and merger between the forward end of the upper plate 8 and the top layer of the tongue 2 is indicated at 9, while the rear or trailing edge 10 of said upper plate 8 is disposed in spaced relation above the corresponding or trailing edge 11 of said bottom plate 7; thus leaving a gap between the rear end portions of the plates. At its rear end and centrally of its sides the bottom plate 7 is formed with a hole 12 for the reception of a ring 13 employed to connect a treble hook 14 to the lure body 1 in trailing relation.

When the above described lure is connected to a fishing line 5 and pulled through the water with relatively slow travel, the lure—by reason of its construction—has a side to side wobble or tadpole-like wiggle which is very attractive to game fish and causes them to strike at the lure. Such wobble or wiggle occurs—upon a straight-ahead pull being imparted to the tongue 2 and bottom 7 from the line 5—by reason of the curvature of the upper plate 8 and its particular positional relationship with respect to the tongue 2 and said bottom plate 7.

As the plates 7 and 8 are spaced apart vertically at their rear or trailing edges, there is no tendency of the water to pocket between the plates, and this assures of the continuance of the desired action as the lure moves forward.

By increasing the speed of travel of the lure through the water, the wobbling or wiggling action is progressively accelerated, as the fisherman may desire, while very fast forward movement results in the lure spinning in full turns to right or left, usually in alternation.

It will thus be recognized that, depending on fishing conditions and the type of game fish being sought, the fisherman, by merely increasing or decreasing the speed of the lure, can accomplish different actions thereof.

In the modified embodiment of the lure, as shown in Figs. 4 and 5, the lure body, here indicated generally at 15, is much the same, except for an added element hereinafter described, as in Figs. 1 and 3, including the tongue 16 adapted for connection with a snap 17; a flat bottom plate 18; and an arcuate upper plate 19 extending rearwardly from the tongue 16 in arched relation over said bottom plate 18.

However, in this embodiment the bottom plate 18 is formed—at its rear end, and centrally of its sides—with a relatively narrow, quarter-twisted web 20 which connects, in integral relation, with a trailing vertical fin or tailpiece 21. The vertical fin or tailpiece 21 is elongated and relatively narrow from top to bottom, extending rearwardly in the central longitudinal vertical plane of the bottom plate 18.

At its rear end the vertical fin or tailpiece 21 is formed with a central hole 22 adapted for the reception of a ring 23 employed to couple a hook 24 in trailing relation to said fin or tailpiece 21.

The embodiment of the lure as in Figs. 4 and 5 functions similarly to the previous embodiment, except that the vertical fin or tailpiece 21 causes the lure to wobble or wiggle much faster, and at all times prevents the lure from full-turning whether there is slow or fast travel through the water.

In either of the described embodiments of the lure there is little tendency for the lure body to engage or become entangled in under-water growth or debris as the lure is pulled through the water; this for the reason that the lure body is closed at its forward end and open at the rear.

From the foregoing description it will be readily seen that there has been produced such a fishing lure as will substantially fulfill the objects of the invention as set forth herein.

While this specification sets forth in detail the present and preferred construction of the fishing lure, still in practice such deviations therefrom may be resorted to as do not form a departure from the spirit of the invention, as defined by the appended claims.

Having thus described the invention, the following is claimed as new and useful, and upon which Letters Patent are desired:

1. A fishing lure comprising a forwardly projecting tongue adapted for connection to a fishing line, an elongated bottom plate rigid with and extending rearwardly from the tongue, a hook attached to the rear end of and trailing the bottom plate, and an elongated arcuate upper plate rigid with and extending rearwardly from the tongue in arching relation above said bottom plate; the tongue and bottom plate being flat and in substantially the same longitudinal plane from end to end.

2. A fishing lure comprising an elongated flat bottom plate, an elongated arcuate upper plate disposed above and in arching relation to the bottom plate and terminating at its rear end in spaced relation to the rear end of the bottom plate, a hook attached to the rear end of and trailing from the bottom plate, and a tongue adapted for connection to a fishing line rigid with and projecting from the top and bottom plates at their forward end, the under surface of the tongue being in straight alinement with the under surface of the bottom plate.

3. A fishing lure comprising an elongated bottom plate, an elongated arcuate upper plate disposed above and in arching relation to the bottom plate and terminating at its rear end in spaced relation to the rear end of the bottom plate, rigid connection means between the plates at the forward end thereof adapted for connection to a fishing line, the bottom plate being flat and straight from end to end, and a hook attached to the rear end of and trailing the bottom plate.

4. A fishing lure comprising an elongated bottom plate, an elongated arcuate upper plate disposed above and in arching relation to the bottom plate and terminating at its rear end in spaced relation to the rear end of the bottom plate, rigid connection means between the plates at the forward end thereof adapted for connection to a fishing line, the bottom plate being flat, an elongated vertical tail fin rigid with and projecting rearwardly from the bottom plate centrally of the width thereof, and a hook attached to and trailing from the rear end of the tail fin.

5. A lure, as in claim 4, in which the tail fin is disposed so that the central longitudinal plane thereof is alined with the bottom plate.

References Cited in the file of this patent

UNITED STATES PATENTS

| | | |
|---|---|---|
| 2,476,126 | Weiss | July 12, 1949 |
| 2,822,637 | Keith | Feb. 11, 1958 |